United States Patent
McCallum

[15] 3,672,134
[45] June 27, 1972

[54] CROP HARVESTER PLATFORM

[72] Inventor: Donald A. McCallum, Burlington, Ontario, Canada

[73] Assignee: International Harvester Company, Chicago, Ill.

[22] Filed: May 26, 1971

[21] Appl. No.: 147,109

[52] U.S. Cl. .............................................. 56/14.4, 56/192
[51] Int. Cl. ............................................. A01d 47/00
[58] Field of Search .................... 56/14.3, 14.4, 153–158, 56/189, 192

[56] References Cited

UNITED STATES PATENTS

| | | | |
|---|---|---|---|
| 2,253,044 | 8/1941 | Ommodt | 56/14.4 |
| 2,484,981 | 10/1949 | Coultas | 56/192 |
| 2,949,718 | 8/1960 | Buchanan | 56/192 |

FOREIGN PATENTS OR APPLICATIONS

| | | | |
|---|---|---|---|
| 507,089 | 9/1930 | Germany | 56/192 |
| 256,783 | 3/1949 | Switzerland | 56/192 |
| 267,885 | 7/1950 | Switzerland | 56/192 |
| 966,978 | 3/1950 | France | 56/192 |
| 1,060,654 | 11/1953 | France | 56/192 |

*Primary Examiner*—Russell R. Kinsey
*Attorney*—Floyd B. Harman

[57] ABSTRACT

A crop harvester having a self-propelled chassis and a crop harvester platform supported forwardly of said chassis for cutting a standing crop and depositing the cut crop into a swath on the ground. The harvester platform includes a cutter, a crop-gathering reel above the cutter, and a pair of gauge wheels behind the cutter for supporting the platform for movement over the ground. A pair of shield structures is mounted on the platform over the respective gauge wheels. The shield structures are arranged to direct the flow of cut crop rearwardly and laterally inwardly of the platform to form the swath.

5 Claims, 3 Drawing Figures

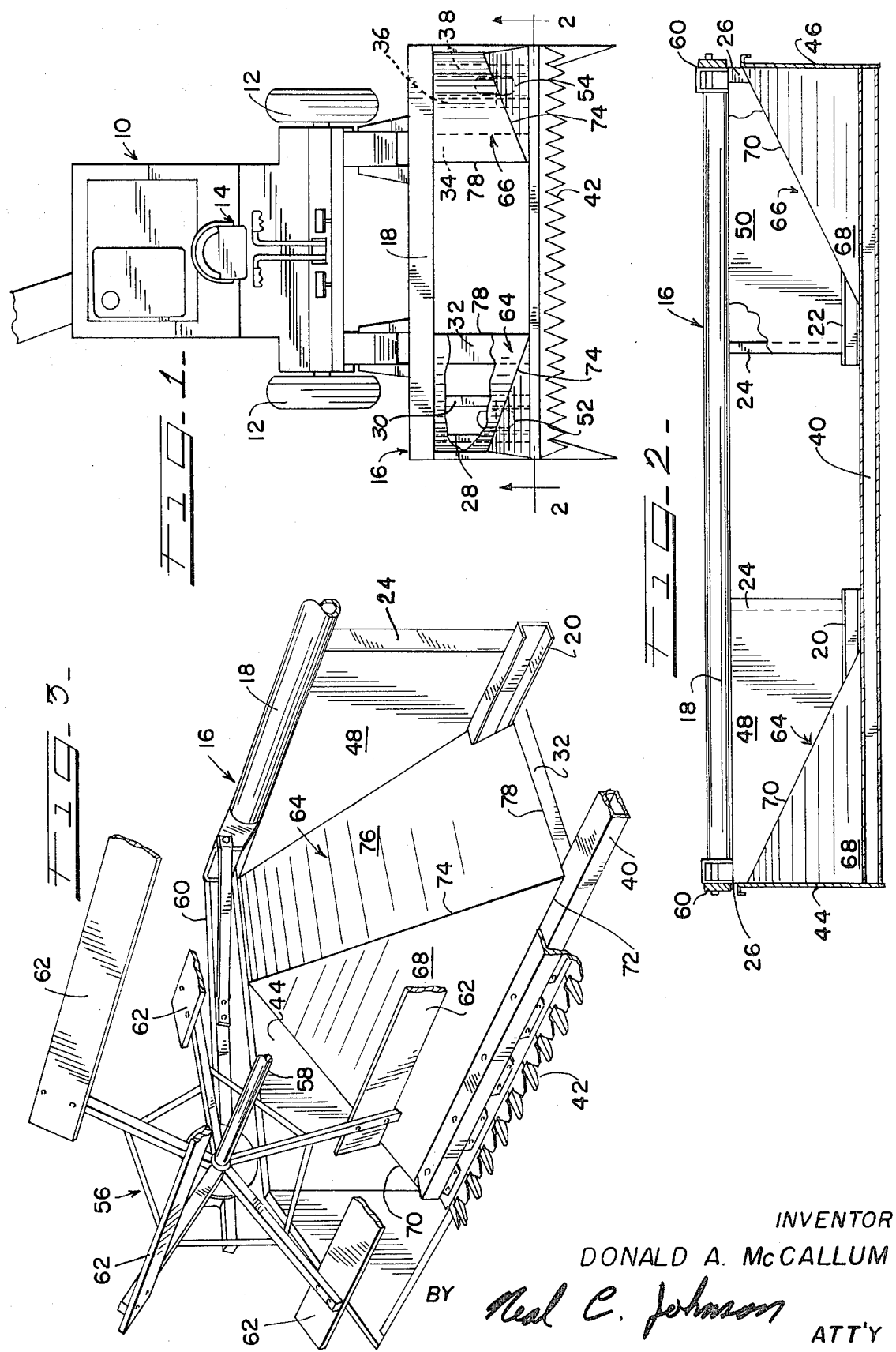

CROP HARVESTER PLATFORM

BACKGROUND OF THE INVENTION

1. Field of the Invention

The invention relates generally to crop harvesting machines and more particularly to an improved crop harvesting platform for cutting and swathing grass, hay and the like.

2. Prior art

The typical swather for hay and the like includes a power driven conveyor disposed behind the cutter for conveying the cut crop transversely to the direction of travel of the machine to condense the crop into a swath or windrow on the ground. Examples of such conveyors include endless belt-type conveyors and rotatable augers. Since these conveyors are power driven, substantial costs are involved in designing and producing the requisite power drive systems, in addition to the costs of the conveyors themselves. The primary problem is to provide a harvester platform with a means for conveying and condensing the crop into a swath and yet eliminate the power driven conveyors normally required.

SUMMARY

The invention provides a crop harvester platform with shield or crop guide structures arranged to receive the cut crop and direct the crop into a swath or windrow on the ground. The shield or crop guide structures completely eliminate the power driven conveyors normally required in a swathing operation. In the preferred embodiment of the invention, the shield structures include portions disposed in proximity to the peripheral path of movement of the crop gathering reel so that the crop is moved along the portions by the reel. Accordingly, the reel contributes to the crop condensing function in addition to its usual function of moving the standing crop rearwardly for cutting by the cutter of the platform. In the case where the platform is equipped with gauge wheels, the shield structures are arranged to guide the cut crop over the wheels.

It is a primary object of the invention to provide a crop harvester platform with means for cutting a crop and condensing the same into a swath without the usual power driven conveyors being required.

It is another object in conjunction with the above object to provide a simplified and less costly harvester platform adapted for cutting and swathing a crop.

BRIEF DESCRIPTION OF THE DRAWINGS

FIG. 1 is a fragmentary plan view of a self-propelled swather showing the harvester platform of the invention;

FIG. 2 is an enlarged sectional view taken in the direction of arrows 2-2 of FIG. 1; and, FIG. 3 is a fragmentary perspective view of the harvester platform of the invention.

DESCRIPTION OF THE PREFERRED EMBODIMENT

Referring first to FIG. 1, there is shown a self-propelled chassis 10 of the type used in a conventional windrower or swather. The chassis 10 includes a pair of spaced drive wheels 12 and a tail wheel assembly (not shown). The chassis 10 includes the usual operator's station shown generally at 14.

A harvester platform shown generally at 16 is supported from the front of the chassis 10 and is elongated transversely to the normal forward direction of travel of the machine. The basic framework of the platform 16 is of conventional construction. A tubular member 18 extends lengthwise of the platform to define the upper rear edge thereof. The lower rear edge of the platform 16 is defined by a pair of channel members 20 and 22 disposed in coextensive relation to each other beneath and parallel to the tubular member 18. Each of the members 20 and 22 is supported from the member 18 by a pair of vertical frame members 24 and 26 shown partially in FIG. 2.

As shown generally in FIG. 1, a plurality of bottom frame members 28, 30, 32, 34, 36, and 38 extend forwardly from the rear of the platform in spaced parallel relation. It will be understood that the frame members 28, 30 and 32 are secured to the channel member 20 and the frame members 34, 36 and 38 are secured to the channel member 22. The forward edge of the platform 16 is defined by a box type beam 40 extending parallel to the members 20 and 22 and secured to the forward ends of the members 28 through 38. A conventional cutter assembly 42 is mounted on the beam 40 as best shown in FIG. 3.

The platform 16 further includes a pair of vertical end walls 44 and 46 disposed at opposite ends of the platform. Vertical rear wall sections 48 and 50 are disposed outwardly from each of the vertical members 24 to cover the area defined between the members 18 and 20 and 18 and 22 respectively. The area defined between the members 24,24 and between the members 18 and 40 is preferably left open to facilitate crop flow as will be subsequently described.

As shown generally in FIG. 1, the platform 16 may include a pair of gauge wheels 52 and 54 to provide rolling ground support for the platform. The gauge wheel 52 is journaled between the frame members 28 and 30 and the other gauge wheel 54 is journaled between the frame members 36 and 38.

In accordance with conventional practice, the platform 16 preferably includes a power driven rotatable reel 56 extending the length of the platform above the cutter assembly 42. The reel 56 includes a central shaft 58 journaled at its ends by a pair of arms 60,60 pivotally mounted on the tubular frame member 18. The reel 56 further includes a plurality of crop-engaging bats 62 disposed in parallel circumferentially spaced relation about the shaft 58. The reel 56 may be raised and lowered by conventional hydraulic means (not shown).

In accordance with the invention, the platform 16 is provided with a pair of crop guide shields 64 and 66 disposed over the gauge wheels 52 and 54 respectively, adjacent to the end walls 44 and 46 respectively. Each of the shields 64 and 66 includes a generally right triangular ramp section 68 inclined upwardly and rearwardly from the beam 40 behind the cutter 42. The right angle of the ramp section 68 is defined by edges 70 and 72 which are disposed adjacent to the end wall 44 (or 46) and the beam 40 respectively. The hypotenuse of the ramp section 68 is shown at 74 extending downwardly and forwardly from the end wall 44 (or 46) to the beam 40. It will be seen that the edge 72 and hypotenuse 74 meet at a point substantially aligned with an edge of the frame member 32 (or 34).

Each shield 64 and 66 further includes a panel section 76 of generally trapezoidal configuration inclined downwardly and inwardly in a direction away from the respective end walls 44 and 46. Each panel section 76 terminates at its lower end in an edge 78 disposed along the respective frame members 32 and 34. The sections 68 and 76 of each shield are joined along the hypotenuse 74. It will be seen in FIG. 1 that the edges 78,78 and the member 18 and beam 40 define an opening therebetween through which the cut crop may flow for deposit on the ground.

In operation, the standing crop is engaged by the bats 62 of the rotating reel 56 and the crop is cut by the cutter assembly 42. The ramp section 68 is disposed in proximity to the peripheral path of movement of the bats 62. Consequently, the bats move the cut crop upwardly along the ramp section 68. The panel sections 76 are disposed in crop-receiving relation to the ramp section 68 so that the crop is transferred onto the panel sections. The crop then slides down the panel section 76 and onto the ground through the crop discharge opening defined between the edges 78,78. It will be seen that the crop immediately forwardly of the crop discharge opening will be moved by the reel 56 rearwardly over the beam 40 and onto the ground. The open area defined between the vertical frame members 24,24 facilitate movement of the crop onto the ground, particularly where a large volume of material is being moved.

From the foregoing, it will be seen that the crop is cut and consolidated into a swath on the ground without a requirement for powered conveyors on the platform.

What is claimed is:

1. In a crop harvesting platform adapted for powered operation along the ground and including a rectangular open-bottom frame elongated transversely to the intended forward direction of movement of the platform, a pair of vertical end walls on the frame, a cutter disposed along the forward edge of the frame, and a crop-gathering reel journaled on the frame above the cutter, wherein the improvement comprises:

a pair of gauge wheels mounted at opposite ends of said frame rearwardly of said cutter and inwardly of the respective end walls for supporting said platform for movement over the ground;

and a pair of crop guide shields mounted at opposite ends of said frame adjacent to the respective end walls and disposed over the respective gauge wheels, each of said shields including a ramp section inclined upwardly and rearwardly from said cutter adjacent a respective end wall and disposed in proximity to the peripheral path of movement of said reel so that the cut crop will be moved along said ramp section by said reel, each of said shields further including a discharge panel inclined downwardly and inwardly in a direction away from the respective end wall and disposed in crop-receiving relation to said ramp section for gravity feeding of the crop transversely inwardly onto the ground.

2. In a swather having a self-propelled chassis including at least two drive wheels spaced from each other transversely to the intended forward direction of travel of the swather, a crop harvesting platform supported by and extending forwardly of said chassis, the platform including a rectangular open-bottom frame elongated transversely to the forward direction of travel, a pair of vertical fore and aft extending end walls at opposite ends of the frame, a cutter disposed along the forward edge of the frame, and a crop-gathering reel journaled on the frame above the cutter for engaging a standing crop being cut by the cutter and conveying the crop rearwardly therefrom, wherein the improvement comprises:

a pair of crop guide shields disposed over the bottom of said frame on opposite ends thereof adjacent to the respective end walls, each of said shields including a ramp section inclined upwardly and rearwardly from said cutter adjacent the respective end wall and disposed in proximity to the peripheral path of movement of said reel so that the cut crop will be moved along said ramp section by said reel, each of said shields further including a discharge panel inclined downwardly and inwardly in a direction away from the respective end wall and disposed in crop-receiving relation to said ramp section, said panels terminating at their lower ends in crop-delivery edges spaced apart to define a crop discharge area for deposit of the crop therethrough onto the ground.

3. The subject matter of claim 2, wherein said crop discharge area is disposed to deposit the crop onto the ground between said drive wheels.

4. In a crop harvesting platform adapted for powered operation along the ground and including a rectangular frame elongated transversely to the intended forward direction of travel of the platform, at least one vertical end wall on the frame, a cutter disposed along the forward edge of the frame, and a crop-gathering reel journaled on the frame above the cutter, wherein the improvement comprises:

a crop guide shield mounted on said frame behind said cutter and adjacent to said end wall, said shield including a ramp section inclined upwardly and rearwardly from said cutter and disposed in proximity to the peripheral path of movement of said reel so that the cut crop will be moved upwardly along said ramp section by said reel, said shield further including a panel section inclined downwardly and inwardly in a direction away from said end wall, said panel section being joined to said ramp section so as to be disposed in crop-receiving relation thereto for gravity feeding of the crop onto the ground.

5. The subject matter of claim 4, wherein said ramp section is generally a right triangle in configuration with the edges defining the right angle being disposed adjacent to said end wall and said cutter respectively, said ramp section being joined to said panel section along the hypotenuse of said ramp section.

* * * * *